United States Patent [19]

Pirotta

[11] Patent Number: 4,872,989

[45] Date of Patent: Oct. 10, 1989

[54] SELECTIVE REMOVAL OF NITRATE IONS FROM SALT SOLUTIONS

[75] Inventor: Marico G. Pirotta, Paris, France

[73] Assignee: Rohm and Haas Company, Philadelphia, Pa.

[21] Appl. No.: 26,079

[22] Filed: Mar. 16, 1987

[51] Int. Cl.⁴ .............................................. B01D 11/04
[52] U.S. Cl. .................................... 210/638; 210/903
[58] Field of Search ........................ 210/634, 638, 903

[56] References Cited

U.S. PATENT DOCUMENTS 4,661,257  4/1987  Kreevoy et al. .................... 210/638

Primary Examiner—Ivars Cintins
Attorney, Agent, or Firm—John E. Taylor, III

[57] ABSTRACT

A process is provided for selectively removing nitrate ions from solutions containing one or more additional ions, especially at high concentrations, by contacting the solution with amine-group-containing material under conditions of high kinetics. The process is particularly suitable for stripping nitrate from solutions which have been used to regenerate anion exchange resins loaded with nitrate ions.

13 Claims, No Drawings

SELECTIVE REMOVAL OF NITRATE IONS FROM SALT SOLUTIONS

This invention is concerned with the selective removal of nitrate ions from salt solutions. It enables solutions containing one or more salts, e.g. sodium chloride, which have been used to regenerate anion exchange resins loaded with nitrate ions, themselves to be regenerated by having the nitrate ions stripped therefrom, thus solving a difficult disposal problem; it may also find use in the treatment of other nitrate-ion-containing fluids, for example fluids encountered in sewage treatment processes. The process of the invention also enables a valuable fertilizer by-product to be produced.

It is well known to remove nitrate ions from water selectively using anion exchange resins. The loaded resins are themselves usually regenerated by contact with an aqueous solution of sodium chloride which usually has a high sodium chloride concentration. This regeneration yields a sodium chloride solution which is contaminated with nitrate ions and this presents a disposal problem. We have now found a process by which the nitrate ions may be selectively removed from the sodium chloride solution, which can then be re-used, and in turn incorporated into a useful fertilizer product.

British Pat. No. 1,461,108 discloses a process for the removal of nitrate ions from nitrate ion-containing solutions using an extraction solution containing a chloride salt of a water-insoluble organic amine in solution in a water-immiscible organic solvent. However, this method is stated to be unsuitable for the removal of nitrate ions from nitrate ion-containing solutions having a high concentration of chloride. Similarly, German Offenlegungsschrift No. 2,350,962 discloses separating nitrate ions from a solution, but not a selective separation in the presence of other anions.

THE INVENTION

According to the present invention there is provided a process for selectively removing nitrate ions from solutions containing one or more salts which comprises contacting the solution with an amine-group-containing material which is insoluble, or only partially soluble, in water but which is soluble in hydrophobic solvent, the contact being effected under conditions of high kinetics, that is, a rapid nitrate removal during a short contact time.

Surprisingly, the process of the present invention enables nitrate ions to be selectively removed from solutions containing high concentrations of one or more salts, particularly sodium chloride.

Commonly, the salt solution contains chloride salt, particularly sodium chloride. However, one or more other salts, for example sulfate, bisulfate, carbonate, bicarbonate, acetate and/or formate salts, may be present in the salt solution either alone or in addition to the chloride salt. The salt solution can have a high salt concentration, typically a salt concentration of more than 1% by weight, based on the total weight of the solution. In a specific embodiment of the present invention, the salt concentration is at least 5%; in yet another embodiment, the salt concentration is at least 10%, by weight, based on the total weight of the solution.

Salt solutions, e.g. sodium chloride solutions, which can be treated by the process of this invention, and would typically be used as regenerants for anion exchange resins, contain at least 1% by weight of the salt(s), based on the total weight of the solution.

The process of the present invention is particularly suitable for the selective removal of nitrate ions from solutions in which the nitrate ion concentration in the solution is less than the concentration of the other anions present in the solution.

The amine-group-containing material used in the process of the invention is in the form of an amine salt, preferably the chloride or sulfate salt, and is conveniently a liquid, for example, a liquid amine. Suitable amine-group-containing materials include lipophilic amines such as the material marketed by Rohm and Haas Company under the trademark Amerblite LA-2 liquid ion exchange resin, which is a secondary amine having a molecular weight of from about 353 to about 395. The lipophilic amine may for example, be in the chloride, hydroxyl, carbonate, bicarbonate, sulfate or bisulfate form.

The process of the invention may be carried out in the presence or absence of organic solvent for the amine-group-containing material. A suitable solvent is kerosene.

Conditions of high kinetics may be achieved in the present invention by contacting the salt solution with the amine-group-containing material for a time not exceeding 10 minutes. It is important that the contact time is such that the transfer of nitrate ions from the salt solution to the amine-group-containing material will not closely approach equilibrium since nitrate ions on the amine-group-containing material may, as equilibrium is approached, be removed from the amine group-containing material by other anions present in the salt solution, particularly if such other anions are present in the salt solution in a concentration greater than that of the nitrate ions. By "conditions of high kinetics" we therefore mean such conditions as will not result in an unacceptable return to the salt solution of any nitrate ions removed therefrom by the amine-group-containing material.

The contact of the salt with the amine-group-containing material may, for example, be effected by mixing these materials together in a vessel, for example, with stirring. Alternatively, the contact of the salt solution with an amine-group-containing material in liquid form and/or in the form of a solution in organic solvent may, for example, be carried out by any conventional liquid-liquid extraction technique such as by passing these materials countercurrently to one another. If either of these techniques is used, then the materials, after contact with each other, may be separated by decanting and/or centrifuging.

The amine-group-containing material, containing nitrate ions removed from the solution, may itself be treated, for example with an aqueous solution of ammonium hydroxide, ammonium carbonate, ammonium bicarbonate or potassium bicarbonate, to thereby remove the nitrate ions from, and regenerate, the amine-group-containing material which may then be re-used as such or after reactivation into a suitable ionic form. When such treatment is carried out, the resulting nitrate-containing material may be useful as a fertilizer, although it may also readily be decomposed for disposal.

The salt solution which has been purified by the process of this invention by the removal of nitrate ions therefrom, may itself be re-used, for example to regenerate spent anion exchange loaded with nitrate ion.

The present invention will now be further illustrated by way of the following Examples, which are for illustrative purposes only and are not to be construed as imposing any limitation on the scope of the invention, except as it is limited in the claims. All proportions are by weight, unless otherwise noted and all reagents are of good commercial quality unless otherwise noted.

EXAMPLE 1

100 ml of nitrate-selective, strongly basic, macroporous, styrenic anion exchange resin beads marketed as Duolite® ES 196 ion exchange resin by Rohm and Haas Company, in the chloride form, was used to remove nitrate ions from polluted water.

The spent resin beads were then regenerated by eluting them with 5 bed volumes of 2M aqueous sodium chloride solution. After such treatment the sodium chloride eluate solution (500 ml) was found to have a sodium chloride concentration of 10% and a nitrate ion concentration of 1.24%.

The eluate solution was then contacted, with stirring, for 1 minute with 2 liters of a 0.1M kerosene solution of secondary amine liquid ion exchange resin having a molecular weight of from 353 to 395, and marketed as Amberlite® LA-2 liquid ion exchange resin by Rohm and Haas Company. The resultant two phases were then separated and the water phase was analyzed and found to have a sodium chloride concentration of 10% and a nitrate ion concentration of only 0.1%.

EXAMPLE 2

A column containing 100 ml of the anion exchange resin beads of Example 1, in the chloride form, was used in downflow column operation to remove nitrate ions from water having the following anion composition:

| Anion | Concentration (meq/liter) |
|---|---|
| Cl | 2 |
| $NO_3$ | 1.5 |
| $SO_4$ | 4 |
| $HCO_3$ | 5 |

The operation cycle of the column was terminated when the residual nitrate concentration in the effluent from the column had reached 50 ppm.

The exhausted resin beads were then regenerated in upflow operation using 10 bed volumes of a 2.5% by weight sodium chloride solution for a period of 1 hour. The first 5 bed volumes of effluent from the column, which were considered to be the fraction containing the main proportion of the nitrate, contained 14 g NaCl/liter and 2.5 g of $NO_3^-$/liter.

EXAMPLE 3

A column containing 100 ml of the anion exchange resin of Example 1, in the chloride form, was used in downflow column operation to remove nitrate ions from water having the following anion composition:

| Anion | Concentration (meq/liter) |
|---|---|
| Cl | 2 |
| $NO_3$ | 3 |
| $SO_4$ | 3 |
| $HCO_3$ | 5 |

The exhausted resin beads were then regenerated in upflow operation using 10 bed volumes of a 2.5% by weight NaCl solution for a period of 1 hour. The first 6 bed volumes of effluent from the column, which were considered to be the fraction containing the main proportion of the nitrate, contained 15.7 g NaCl/liter and 3.8 g $NO_3^-$/liter.

The first 6 bed volumes (i.e. 600 ml) of effluent were then contacted with 360 ml of a 15% wt/wt solution of the liquid ion exchange resin of Example 1 in hexane. The resulting mixture was stirred for 1 minute and then the two phases were separated. The aqueous phase was found to contain 9.6 g NaCl/liter and 0.3 g $NO_3^-$/liter.

EXAMPLE 4

This example illustrates the recovery of nitrate from the liquid ion exchange resin of Example 1.

A 10% wt/wt solution of the liquid ion exchange resin of Example 1 in kerosene was prepared and neutralized with a solution containing 0.5 eq HCl/liter and 0.5 eq $HNO_3$/liter. The resulting solution, which contained the amine about 50% in the $NO_3^-$ form and about 50% in the $Cl^-$ form, was similar in composition to the liquid ion exchange resin (chloride form) after it has been used to extract nitrate ions from the first fraction of a regeneration effluent of an anion exchange resin used to remove nitrate ions from polluted water.

The neutralized liquid ion exchange resin solution was stirred for 30 minutes with an equal volume of an aqueous sodium nitrate solution containing 600 g $NaNO_3$/liter of water. The phases were then separated and the organic phase was found to contain the amine 95% in the nitrate form and only 5% in the chloride form.

When this amine was regenerated using ammonium hydroxide or ammonium carbonate, the resulting ammonium nitrate solution was found to be a useful by-product in that the ammonium nitrate could be incorporated into, or used directly as, a fertilizer.

After neutralization of the thus regenerated liquid resin, it could be used to extract nitrate from spent anion exchange resin regenerant.

From Examples 1–3 it can be seen that the liquid ion exchange resin can be used, in accordance with the process of the invention, to selectively remove nitrate ions from aqueous solutions containing high concentrations of one or more salts.

Example 4 illustrates how the spent liquid ion exchange resin, i.e. loaded with nitrate ions, may be regenerated for further use while at the same time producing a useful by-product.

"Amberlite" and "Duolite" are trademarks of Rohm and Haas Company.

I claim:

1. A process for selectively removing nitrate ions from an aqueous solution containing one or more dissolved salts, including at least about 1% by weight of a chloride salt, based on the total weight of the solution, which comprises contacting the aqueous solution, under conditions of high kinetics, with a water-insoluble, hydrophobic-solvent-soluble, amine-group-containing material, and subsequently separating the aqueous solution from the amine-group-containing material.

2. The process as claimed in claim 1, wherein the amine-group-containing material is a liquid amine.

3. The process as claimed in claim 2, wherein the amine-group-containing material is a lipophilic amine, in a salt form selected from the group consisting of chloride, hydroxyl, carbonate, bicarbonate, sulphate and bisulphate.

4. The process as claimed in claim 1, wherein the process is carried out in the presence of organic solvent from the amine-group-containing material.

5. The process as claimed in claim 4 wherein the organic solvent is kerosene.

6. The process as claimed in claim 1, wherein the aqueous solution is contacted with the amine-group-containing material for a period of less than 10 minutes.

7. The process as claimed in claim 1, wherein the aqueous solution comprises one or more of sulphate, bisulphate, carbonate, bicarbonate, acetate and formate salts.

8. The process as claimed in claim 7, wherein the aqueous solution comprises sodium chloride.

9. The process as claimed in claim 1, wherein the aqueous solution has a nitrate ion concentration less than the salt(s) anion concentration.

10. The process as claimed in claim 9, wherein the aqueous solution has a salt concentration of greater than 1% by weight.

11. The process as claimed in claim 9 wherein the aqueous solution has a salt concentration of at least 5% by weight.

12. The process as claimed in claim 1, wherein the aqueous solution is contacted with the amine-group-containing material by mixing together the aqueous solution and the amine-group-containing material.

13. The process as claimed in claim 1 wherein the amine-group-containing material is a liquid or is in the form of a solution in organic solvent, and the aqueous solution is contacted with the amine-group-containing material by passing the aqueous solution countercurrently to the amine group-containing material.

* * * * *